(12) United States Patent
Jacobson et al.

(10) Patent No.: US 10,457,804 B2
(45) Date of Patent: Oct. 29, 2019

(54) SANDWICH AND METHOD FOR FORMING

(75) Inventors: Peter Jacobson, Cleveland Heights, OH (US); Marc de Longree, Genval (BE)

(73) Assignee: Arlington Valley Farms LLC, Cleveland, OH (US)

( * ) Notice: Subject to any disclaimer, the term of this patent is extended or adjusted under 35 U.S.C. 154(b) by 0 days.

(21) Appl. No.: 12/958,313

(22) Filed: Dec. 1, 2010

(65) Prior Publication Data

US 2011/0135792 A1     Jun. 9, 2011

Related U.S. Application Data

(60) Provisional application No. 61/265,457, filed on Dec. 1, 2009.

(51) Int. Cl.
*C08L 33/14* (2006.01)

(52) U.S. Cl.
CPC .................................... *C08L 33/14* (2013.01)

(58) Field of Classification Search
CPC ............... A21D 10/04; A21D 13/0022; A21D 13/0019; A21D 13/0045; A21D 13/0048; A21D 13/0051; A21D 13/0054; A21D 13/0003; A21D 10/00; A23L 1/0047; A23L 1/005; A23L 1/0064; A23L 1/004767; A23L 1/007
USPC .......................................... 426/304, 94, 302
See application file for complete search history.

(56) References Cited

U.S. PATENT DOCUMENTS

| | | | |
|---|---|---|---|
| 3,250,625 A * | 5/1966 | Thelen | ........................... 426/103 |
| 4,517,203 A | 5/1985 | Levine et al. | |
| 4,877,629 A | 10/1989 | Stypula | |
| 4,948,603 A | 8/1990 | Bernacchi et al. | |
| 5,194,271 A | 3/1993 | Yasosky | |
| 5,520,937 A | 5/1996 | Yasosky et al. | |
| 5,614,240 A | 3/1997 | Young | |
| 5,955,129 A | 9/1999 | Haas, Sr. et al. | |
| 6,013,300 A | 1/2000 | Reichkitzer et al. | |
| 6,265,005 B1 * | 7/2001 | Haverkos et al. | ............ 426/302 |
| 6,511,691 B1 | 1/2003 | Willoughby et al. | |
| 6,623,778 B2 | 9/2003 | Kershman et al. | |
| 2002/0068115 A1 | 6/2002 | Hayes-Jacobson | |
| 2002/0094366 A1 | 7/2002 | Kershman et al. | |
| 2004/0018287 A1 | 1/2004 | Kershman et al. | |
| 2004/0081934 A1 | 4/2004 | Haas et al. | |
| 2004/0219271 A1 | 11/2004 | Belknap et al. | |
| 2005/0025862 A1 * | 2/2005 | Morad et al. | ................... 426/94 |

(Continued)

FOREIGN PATENT DOCUMENTS

| | | |
|---|---|---|
| EP | 0540521 B1 | 3/1995 |
| EP | 0683982 | 11/1995 |

(Continued)

OTHER PUBLICATIONS

SNL Transcripts: Jon Heder: Taco Town, Oct. 8, 2005.*

(Continued)

*Primary Examiner* — Erik Kashnikow
*Assistant Examiner* — Lela S. Williams
(74) *Attorney, Agent, or Firm* — Fay Sharpe LLP (57) ABSTRACT

A sandwich includes a partially baked sandwich insert and a chemically-leavened batter layer that envelops at least a portion of the partially baked sandwich insert. The partially baked sandwich insert includes a filling that is completely enveloped by a yeast-leavened dough.

12 Claims, 8 Drawing Sheets

(56) References Cited

U.S. PATENT DOCUMENTS

| | | |
|---|---|---|
| 2005/0048182 A1 | 3/2005 | King et al. |
| 2006/0073246 A1 | 4/2006 | Valenzky et al. |
| 2006/0121160 A1 | 6/2006 | Preppernau et al. |
| 2008/0057157 A1 | 3/2008 | Almeida et al. |
| 2008/0248168 A1* | 10/2008 | Black .................. A21D 10/02 426/92 |
| 2009/0081347 A1 | 3/2009 | Gambino |
| 2011/0135792 A1 | 6/2011 | Jacobson |

FOREIGN PATENT DOCUMENTS

| | | |
|---|---|---|
| WO | WO-2005/112664 A1 | 12/2005 |
| WO | 2011068902 | 6/2011 |
| WO | 2013138581 | 9/2013 |

OTHER PUBLICATIONS

Lauterbach, Functions of Baking Ingredients, Jan. 1994.*
Non-Final Office Action for U.S. Appl. No. 13/419,505 dated Mar. 13, 2013, 17 pages.
Final Office Action for U.S. Appl. No. 13/419,505 dated Jan. 17, 2014, 18 pages.
International Search Report for PCT Application No. PCT/US2010/058601 dated Aug. 23, 2011, 3 pages.
Written Opinion for PCT Application No. PCT/US2010/058601 dated Aug. 23, 2011, 4 pages.
International Search Report for PCT Application No. PCT/US2013/031294 dated Jul. 5, 2013, 4 pages.
Written Opinion for PCT Application No. PCT/US2103/031294 dated Jul. 5, 2013, 5 pages.

* cited by examiner

SANDWICH AND METHOD FOR FORMING

RELATED APPLICATION

This application claims priority from U.S. Provisional Application Ser. No. 61/265,457, filed Dec. 1, 2009, the entirety of which is hereby incorporated by reference.

TECHNICAL FIELD

The present invention relates generally to filled food products, and more particularly to a sandwich and method for forming the sandwich.

BACKGROUND OF THE INVENTION

The demand for convenience food has steadily increased in recent years. As people look to find ways to maximize their free time, ready-made meals and snack products have become increasingly popular with consumers. Most households now have a microwave oven to assist in the rapid heating of food. Accordingly, a large number of ready-made meals and snacks have been developed which can be heated in a microwave oven.

While these types of snacks and meals can be quickly heated in a microwave oven, the types of meals and snacks that are suitable for heating in such ovens are, to some extent, limited. For example, snacks of a type which have a filling surrounded by a crispy coating cannot be satisfactorily prepared in a microwave oven. This is because steam, generated during the heating process by evaporation of water from the filling, is deleterious to the organoleptic qualities of the coating. Indeed, the steam penetrates the outer coating rendering it moist, soggy and unappetizing. Such crispy-coated products can only be satisfactorily prepared by heating in a conventional oven, or frying in oil to maintain crispness. This considerably lengthens the time required to prepare such snacks, thus making them far less convenient to prepare.

SUMMARY OF THE INVENTION

According to one aspect of the present invention, a multi-layered sandwich product comprises a partially baked sandwich insert and a chemically-leavened batter layer that envelops at least a portion of the partially baked sandwich insert. The partially baked sandwich insert includes a filling that is completely enveloped by a yeast-leavened dough.

According to another aspect of the present invention, a method is provided for forming a multi-layered sandwich product. One step of the method includes partially baking a sandwich insert in a first bi-molded plate assembly. The sandwich insert comprises a filling that is completely enveloped by a yeast-leavened dough. Next, the partially baked sandwich insert is placed into a second bi-molded plate assembly so that the partially baked sandwich insert is located atop a first amount of a chemically-leavened batter layer. A second amount of the chemically-leavened batter is then poured into the second bi-molded plate assembly so that the second amount of the chemically-leavened batter completely envelops the partially baked sandwich insert. The second bi-molded plate assembly is heated for a time and at a temperature sufficient to bake the multi-layered sandwich product.

According to another aspect of the present invention, a multi-layered sandwich product comprises a sandwich insert having a filling that is completely enveloped by a yeast-leavened dough.

According to another aspect of the present invention, a method is provided for forming a multi-layered sandwich product. One step of the method includes heating a bi-molded plate assembly to a predetermined temperature. The bi-molded plate assembly comprises a receptacle member and lid member. Each of the receptacle member and the lid member includes a cavity. Next, a sandwich insert is placed into the receptacle member. The sandwich insert comprises a filling that is completely enveloped by a yeast-leavened dough. After placing the sandwich insert into the receptacle member, the lid member is mated with the receptacle member so that the cavity of each of the lid member and the receptacle member forms a heated and sealed baking cavity. The sandwich insert is then baked for a period of time. After the period of time, the baked sandwich insert is recovered.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

The present invention relates generally to filled food products, and more particularly to a multi-layered sandwich product and method for forming the multi-layered sandwich product. As representative of one aspect of the present invention, FIGS. 1A-2D illustrates a multi-layered sandwich product 10 or 10' that combines the strength and functionality of sandwich bread with the delicate eating quality of a quick bread or cake. Unlike filled food products of the prior art, the multi-layered sandwich product 10 or 10' of the present invention combines a yeast-leavened dough sandwich insert 12 or 12', which gives the product its necessary support to be eaten as sandwich, with a chemically-leavened batter 14 that gives the product a soft and appealing eating quality, which is absent in purely yeast-leavened sandwiches. Additionally, the multi-layered sandwich product 10 or 10' can be initially warmed in a microwave and then reconstituted in an oven or toaster to yield a food product having a crispy exterior and a soft interior without the chewy or tough consistency of a typical bread sandwich.

Figure 1A:
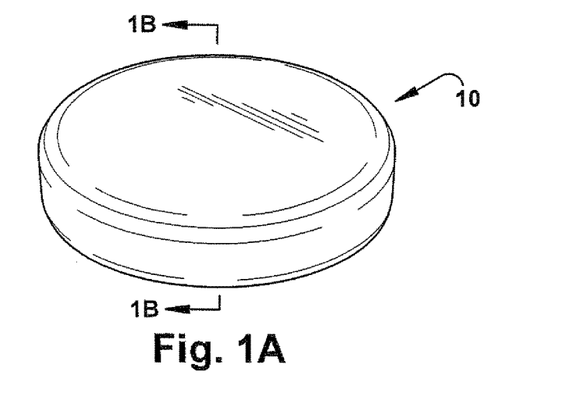
FIG. 1A is a perspective view of a multi-layered sandwich product in accordance with one aspect of the present invention.
Figure 2A:
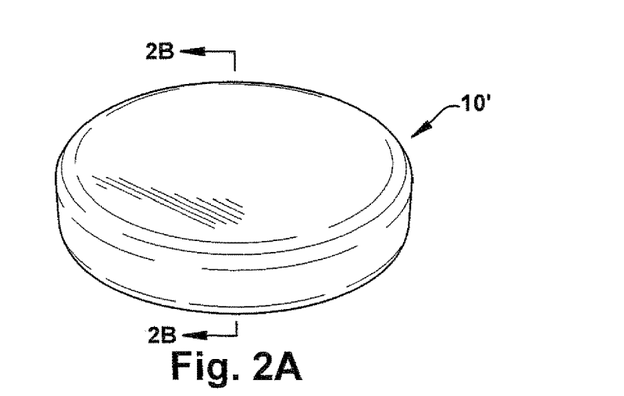
FIG. 2A is a perspective view of a multi-layered sandwich product in accordance with another aspect of the present invention.
Figure 2B:
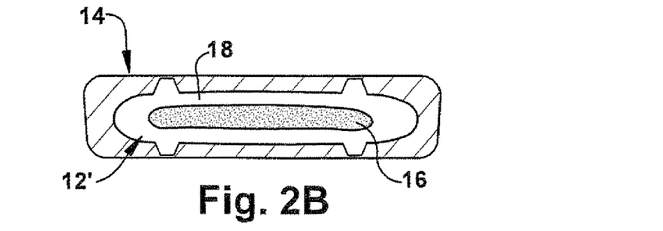
FIG. 2B is a cross-sectional view taken along Line 2B-2B in FIG. 2A.

The multi-layered sandwich product 10 or 10' has a molded configuration (e.g., puck-shaped) and a partially uniform color. The partially uniform color gives the multi-layered sandwich product 10 or 10' the appearance of a home-baked sandwich that has been prepared on a griddle, pan or Panini. Although the multi-layered sandwich product 10 or 10' is shown as having a puck-shaped configuration, it will be appreciated that the product can have any desirable shape and size that makes the product versatile and easy to consume. For example, the multi-layered sandwich product 10 can have any shape and size that enables a consumer to easily eat the multi-layered sandwich product at home or on-the-go without any mess. The molded configuration of the multi-layered sandwich product 10 or 10' also allows the product to be quickly and easily reconstituted for consumption in a microwave and/or toaster.

Figure 1B:
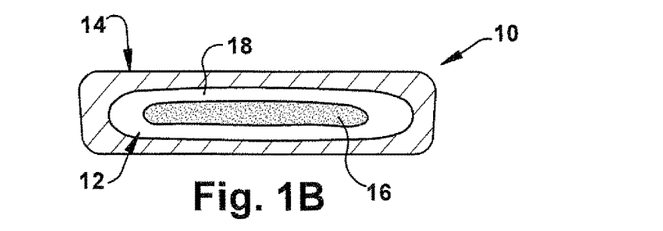
FIG. 1B is a cross-sectional view taken along Line 1B-1B in FIG. 1A.

As shown in FIG. 1B, the multi-layered sandwich product 10 comprises a partially baked sandwich insert 12 or 12' that includes a filling 16, which is completely enveloped by a yeast-leavened dough 18. The partially baked sandwich insert 12 or 12' is completely enveloped by a chemically-leavened batter layer 14. The partially baked sandwich insert 12 or 12' has a molded configuration (e.g., a puck-like shape). As noted above, the partially baked sandwich insert 12 or 12' additionally includes a filling 16 that is completely enveloped by the yeast-leavened dough 18. The filling 16 can comprise any desired solid or semi-solid food product that is typically included as part of a sandwich. Examples of fillings 16 can include fruit, cheese, eggs, meat (e.g., ham, bacon, sausage, hamburger, chicken, turkey, etc.), vegetables, sauces, and/or a combination thereof.

The multi-layered sandwich product 10 or 10' combines the distinctive structural and taste characteristics of yeast- and chemically-leavened breads into a single food product. Yeast-leavened breads use fermentation to create carbon dioxide "bubbles" and thereby leaven the dough. Fermentation begins by mixing the necessary ingredients together to develop a strong gluten structure, which allows the dough to accumulate carbon dioxide. Leavening continues to occur in the proofing stage, in which a low heat and high humidity environment promotes optimal yeast fermentation. Yeast leavening is highly regarded as contributing desirable tastes and aromas to bread. For example, yeast-leavened breads tend to have a smooth outer crust and airy, flaky interiors.

Chemically-leavened breads, also known as "quick breads", are formed by the reaction of bicarbonate compounds with acid-reactive ingredients. Sodium bicarbonate is the most commonly used chemical leavening agent, but potassium and ammonium bicarbonates are also used. Chemical leavening typically occurs in two stages. The first stage releases carbon dioxide during mixing, while the second stage releases carbon dioxide during the baking process by the activation of certain chemical leavening ingredients. One advantage of chemical leavening is the quick formation of carbon dioxide bubbles within a dough or batter mixture, without the need for proofing. Unlike yeast-leavened breads, quick breads are known for having a slightly coarse texture and soft crusts.

The weight-percent (wt-%) of the chemically-leavened batter 14, the filling 16, and the yeast-leavened dough 18 can be varied to impart the multi-layered sandwich product 10 or 10' with desired structural and taste characteristics. In one example of the present invention, the wt-% of the filling 16 can be about 15% to about 60% of the total weight of the multi-layered sandwich product 10 or 10', the wt-% of the yeast-leavened dough 18 can be about 10% to about 60% of the total weight of the multi-layered sandwich product, and the wt-% of the chemically-leavened batter layer 14 can be about 15% to about 60% of the total weight of the multi-layered sandwich product.

The leavening agents and/or other ingredients used to form the chemically-leavened batter layer 14 and the yeast-leavened dough 18 can also be varied depending upon the particular structural and taste characteristics of the multi-layered sandwich product 10 or 10'. For example, the wt-% of yeast to flour in the yeast-leavened dough 18 can be about 3% to about 6%. Additionally, one or a combination of chemical leavening agents (e.g., baking powder) can be used to form the chemically-leavened batter layer 14. For example, the wt-% of the chemical leavening agent (e.g., baking powder) to flour in the chemically-leavened batter layer 14 can be about 4% to about 8%.

FIGS. 2A-D illustrate a multi-layered sandwich product 10' according to another aspect of the present invention. The multi-layered sandwich product 10' can have a molded configuration (e.g., puck-shaped) and a partially uniform color. Although the multi-layered sandwich product 10' is shown as having a puck-shaped configuration, it will be appreciated that the product can have any desirable shape and size that makes the product versatile and easy to consume.

Figure 2C:
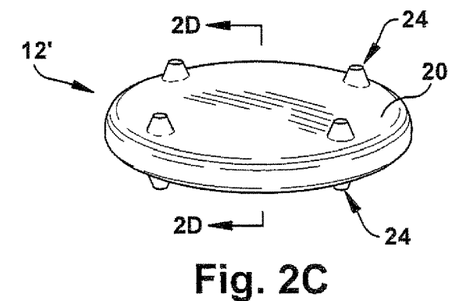
FIG. 2C is a perspective view of a partially baked sandwich insert comprising a portion of the multi-layered sandwich product in FIGS. 2A-B.
Figure 2D:
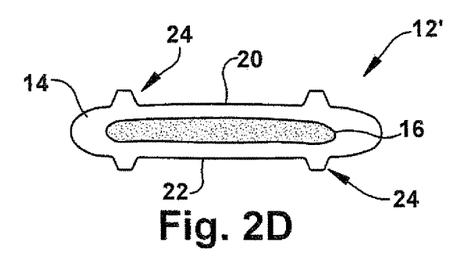
FIG. 2D is a cross-sectional view taken along Line 2D-2D in FIG. 2C.

As shown in FIGS. 2A-D, the partially baked sandwich insert 12' has a molded configuration (e.g., a puck-like shape) and is defined by oppositely disposed first and second major surfaces 20 and 22. At least one of the first and second major surfaces 20 and 22 can include a finger member 24 that projects outwardly from at least one of the first and second major surfaces. As shown in FIG. 2C, for example, each of the first and second major surfaces 20 and 22 can include a plurality of finger members 24. The finger members 24 generally serve to secure the partially baked sandwich insert 12' within the chemically-leavened batter layer

14 and prevent the insert from "sinking" to either side of the multi-layered sandwich product 10'.

The finger members 24 are formed from the yeast-leavened dough 18 and are dispersed about the first and second major surfaces 20 and 22. The finger members 24 can be dimensioned (e.g., have a sufficient height, width, and width) to keep the partially baked sandwich insert 12' from sinking to either side of the multi-layered sandwich product 10'. The finger members 24 may or may not be visible about the multi-layered sandwich product 10'. The finger members 24 can be symmetrically or asymmetrically dispersed about the first major surface 20 and/or the second major surface 22. The finger members 24 can have any desired shape or configuration, such as the dome-shaped configuration shown in FIG. 2C. Although not shown, it will be appreciated that one or more of the finger members 24 can alternatively have a ridge-like configuration that extends across all or only a portion of the first major surface 20 and/or the second major surface 22.

Figure 3A:
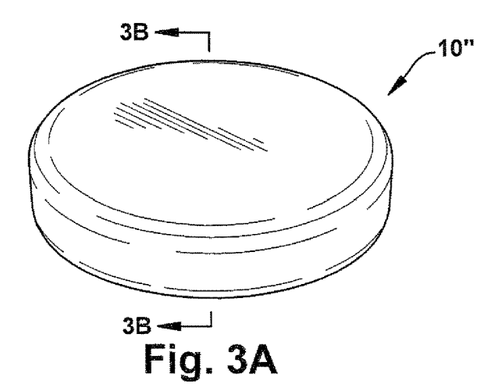
FIG. 3A is a perspective view of a multi-layered sandwich product in accordance with another aspect of the present invention.
Figure 3B:
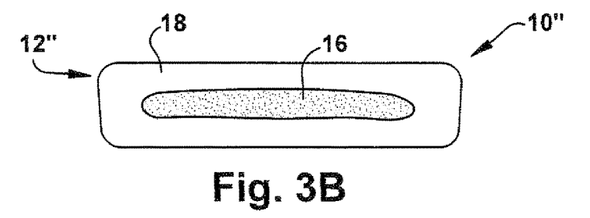
FIG. 3B is a cross-sectional view taken along Line 3B-3B in FIG. 3A.

FIGS. 3A-B illustrate a multi-layered sandwich product 10" according to another aspect of the present invention. The multi-layered sandwich product 10" can have a molded configuration (e.g., puck-shaped) and a partially uniform color. Although the multi-layered sandwich product 10" is shown as having a puck-shaped configuration, it will be appreciated that the product can have any desirable shape and size that makes the product versatile and easy to consume. For example, the multi-layered sandwich product 10" can have any shape and size that enables a consumer to easily eat the multi-layered sandwich product at home or on-the-go without any mess. The molded configuration of the multi-layered sandwich product 10" also allows the product to be quickly and easily reconstituted for consumption in a microwave and/or toaster.

As shown in FIG. 3B, the multi-layered sandwich product 10" can comprise a sandwich insert 12" including a filling 16 that is completely enveloped by a yeast-leavened dough 18. As described above, the filling 16 can comprise any desired solid or semi-solid food product that is typically included as part of a sandwich (e.g., fruit, cheese, eggs, meat, vegetables, sauces, and/or a combination thereof).

The weight-percent (wt-%) of the filling 16 and the yeast-leavened dough 18 can be varied to impart the multi-layered sandwich product 10" with desired structural and taste characteristics. In one example of the present invention, the wt-% of the filling 16 can be about 25% to about 75% of the total weight of the multi-layered sandwich product 10", and the wt-% of the yeast-leavened dough 18 can be about 25% to about 75% of the total weight of the multi-layered sandwich product.

Figure 4:
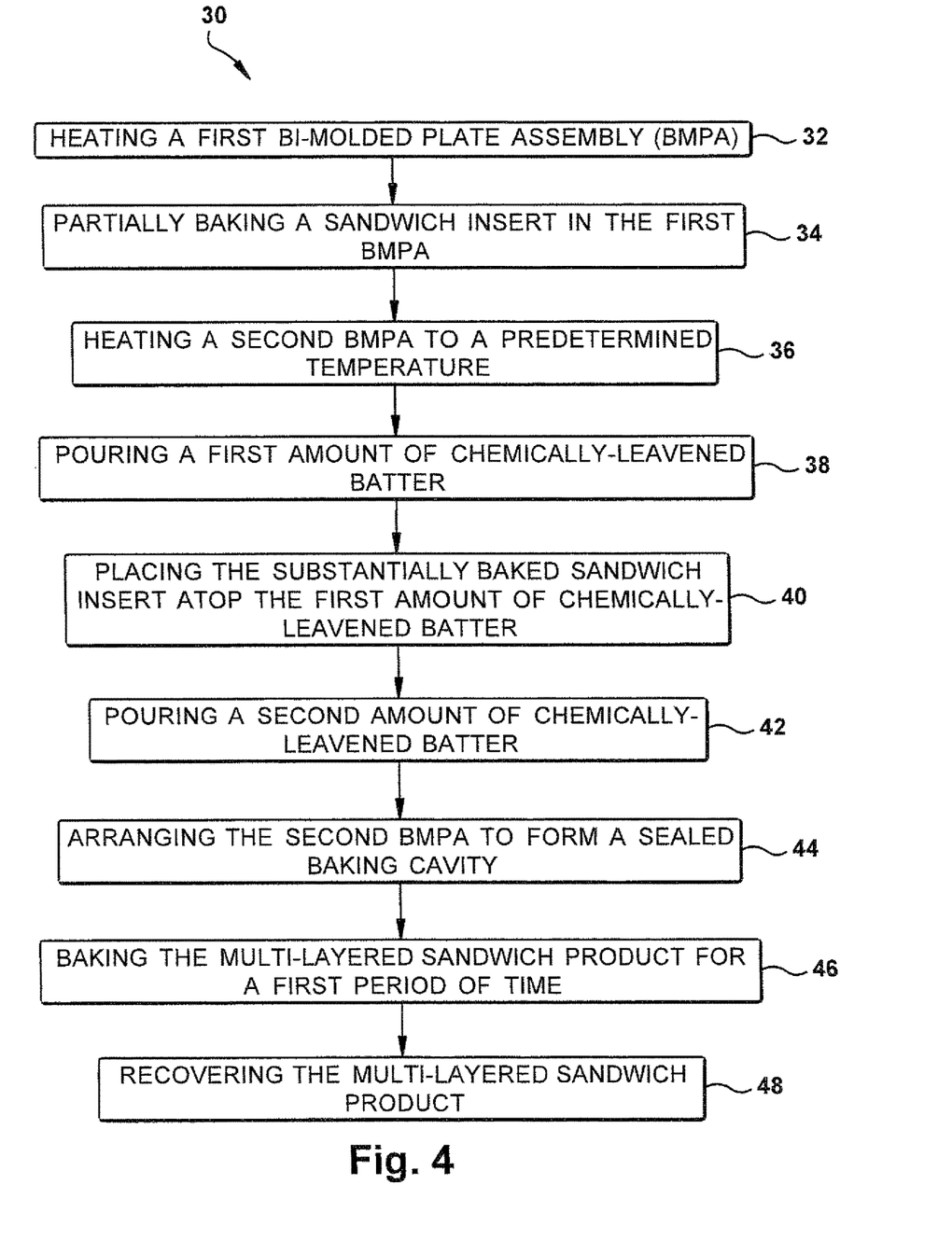
FIG. 4 is a process flow diagram illustrating a method for forming a multi-layered sandwich product according to another aspect of the present invention.

As illustrated in FIG. 4, another aspect of the present invention includes a method 30 for forming a multi-layered sandwich product 10 or 10'. The method 30 is performed using an automated assembly line system (FIGS. 5-6) comprising first and second automated assembly lines 50 and 52. The first automated assembly line 50 is for preparing the partially baked sandwich insert 12 or 12' and comprises a series of upper and lower loop-shaped tracts 54 and 56, a portion of each of which is disposed within an oven 58. The upper and lower tracts 54 and 56 of the first automated assembly line 50 include a plurality of first baking plates 60 securely mounted thereto that can be securely mated together to form a plurality of first bi-molded plate assemblies 62 (FIGS. 7A-B).

Figure 7A:
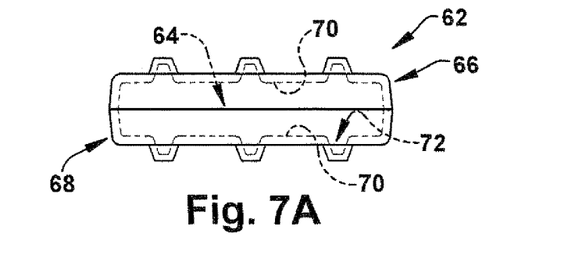
FIG. 7A is a perspective view of a first bi-molded plate assembly for forming the partially baked sandwich product in FIGS. 2A-D.
Figure 7B:
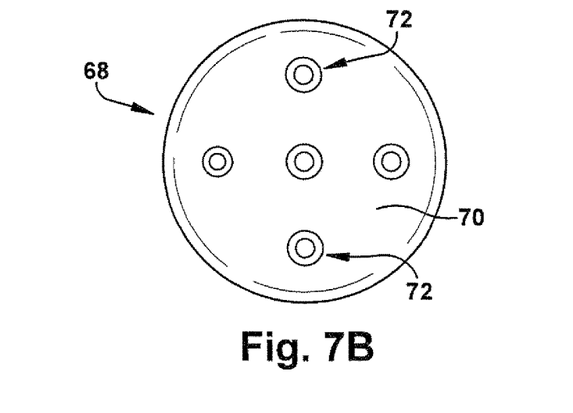
FIG. 7B is a top view of a second baking plate of the first bi-molded plate assembly in FIG. 7A.

As shown in FIGS. 7A-B, each of the first bi-molded plate assemblies 62 formed by each the first baking plates 60 have a puck- or disc-shaped configuration and form a cavity 64 therebetween. The cavity 64 is defined by first and second plates 66 and 68. The dimensions (e.g., height, width, length, cavity depth, etc.) of the first and second plates 66 and 68 can be about equal so that the dimensions of the partially baked sandwich insert 12 or 12' formed by the method 30 are also about equal. An inner surface 70 of each of the first and second plates 66 and 68 can include at least one depression 72 for forming the finger members 24. For example, each of the depressions 72 can have a dome-shaped configuration for producing finger members 24 having a configuration as shown in FIGS. 2A-D. It will be appreciated that the depressions 72 can have any configuration for forming finger members 24 with any corresponding desired configuration. All or only a portion of each of the first bi-molded plate assemblies 62 can be made of a rigid, heat-conductive material (e.g., a metal or metal alloy).

Figure 5:
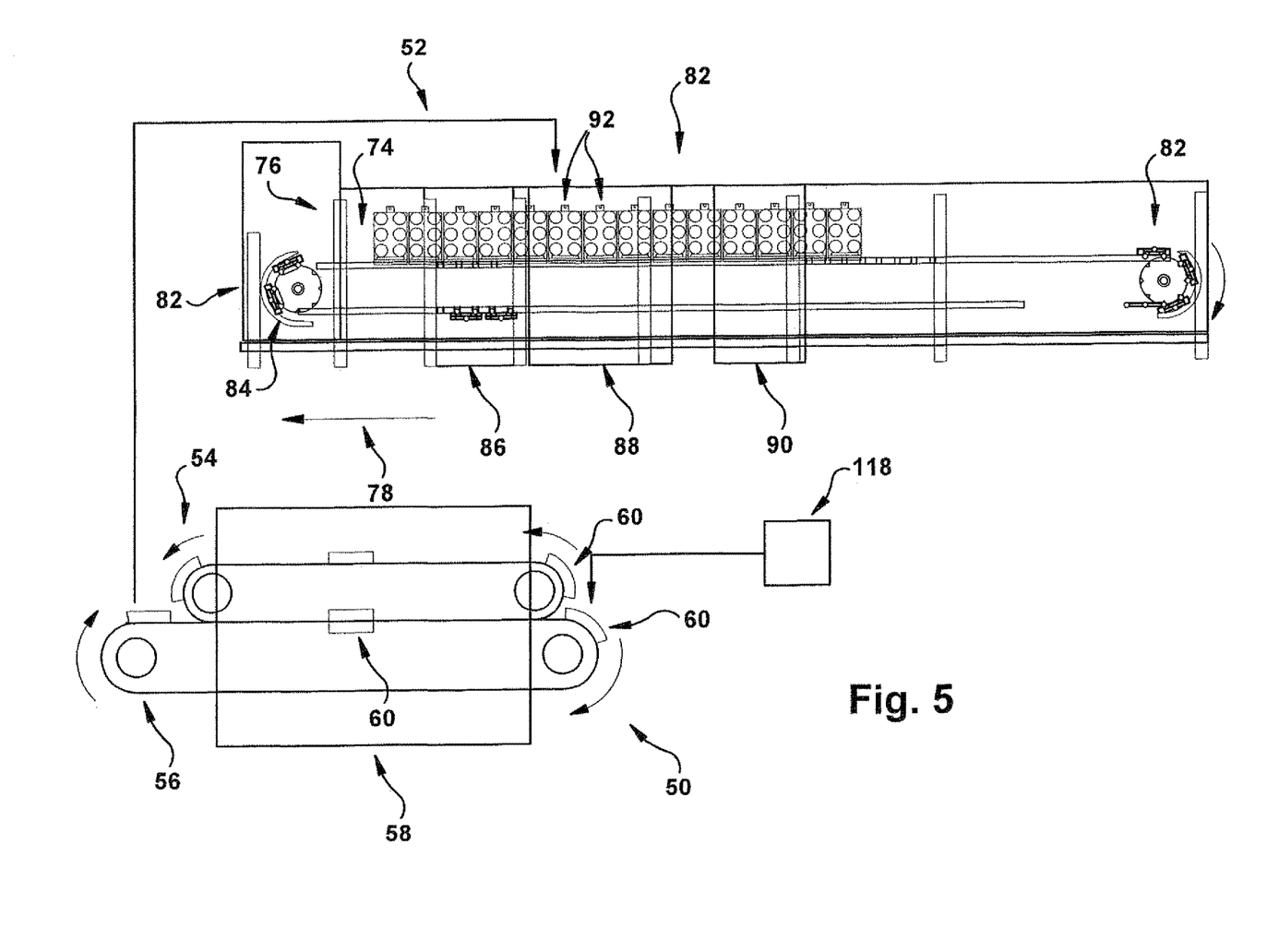
FIG. 5 is a schematic diagram showing an automated assembly line system used to form the multi-layered sandwich product of the present invention.

As shown in FIG. 5, the second automated assembly line 52 is for preparing the multi-layered food product 10 or 10' and comprises a continuous, loop-shaped tract 74 having an upper portion 76 and a lower portion 78. A portion of the second assembly line 52 is seated within an oven 80. The tract 74 of the second assembly line 52 is operably mated to opposing rotation members 82, each of which is separately or jointly powered by a power source (not shown). As described in greater detail below, the second assembly line 52 also includes an automatic removing system 84, a first batter injector 86, a sandwich insert feeding system 88, and a second batter injector 90.

Figure 8A:
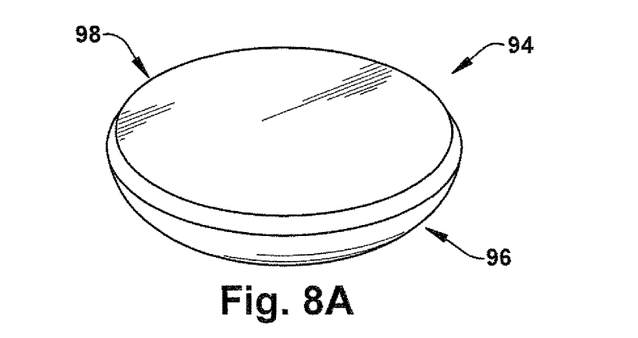
FIG. 8A is a perspective view of a second bi-molded plate assembly for forming the multi-layered sandwich product in FIGS. 1A-2D, the second bi-molded plate assembly comprising a lid member and a receptacle member.
Figure 8B:
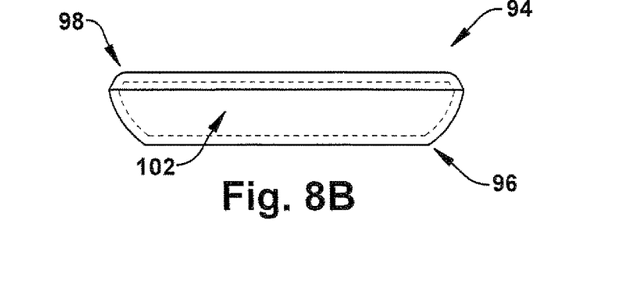
FIG. 8B is a side view of the second bi-molded plate assembly in FIG. 8A.

The second assembly line 52 also comprises a plurality of second baking plates 92, each of which includes at least one of a second bi-molded plate assembly 94 (FIGS. 8A-B). As shown in FIG. 5, the second assembly line 52 includes fourteen second baking plates 92 having six of the second bi-molded plate assemblies 94 in each. It will be appreciated that the number of the second baking plates 92, as well as the number of the second bi-molded plate assemblies 94 comprising each of the second baking plates can be varied depending upon production needs and the configuration of the second assembly line 52.

Figure 9A:
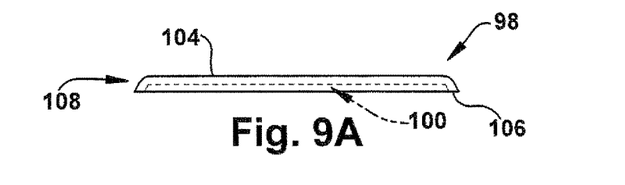
FIG. 9A is a side view of the lid member shown in FIG. 8A.
Figure 9B:
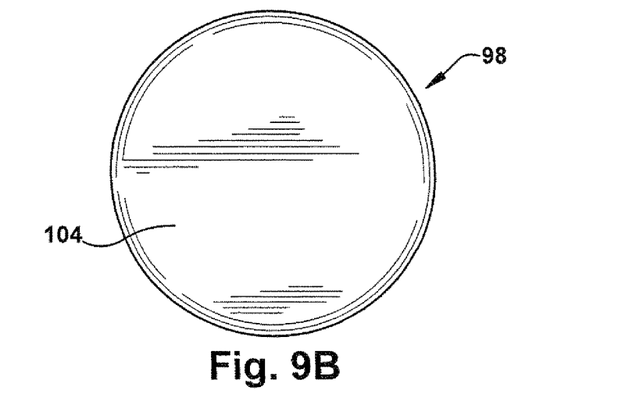
FIG. 9B is a top view of the lid member shown in FIG. 9A.
Figure 10A:
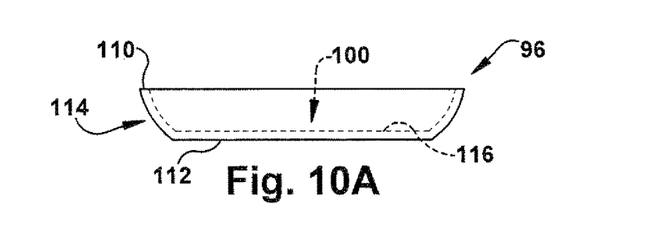
FIG. 10A is a side view of the receptacle member shown in FIG. 8A.

As shown in FIGS. 8A-B, each of the second bi-molded plate assemblies 94 comprises a receptacle member 96 and a lid member 98. All or only a portion of each of the second bi-molded plate assemblies 94 can be made of a rigid, heat-conductive material (e.g., a metal or metal alloy). The receptacle member 96 and the lid member 98 each have a generally circular or oval-shaped configuration and include a cavity 100 (FIGS. 9A and 10A). When the receptacle member 96 (FIG. 8B) and the lid member 98 are securely mated with one another, the cavities 100 of the lid member and the receptacle member form a molded baking cavity 102.

The molded baking cavity 102 can have a diameter of about 6 cm to about 15 cm, and a depth of about 1 cm to about 5 cm.

The molded baking cavity 102 is designed to hold and bake all the components of the multi-layered sandwich product 10 or 10' simultaneously. Consequently, the flavor of the multi-layered sandwich product 10 or 10' is enhanced through the process of baking the product components within the molded baking cavity 102. In addition to the leavening power that the multi-layered sandwich product 10 or 10' receives from the yeast-leavened dough 18 and the chemically-leavened batter 14, the multi-layered sandwich product receives further leavening from the steam generated within the sealed molded baking cavity 102 during the baking process.

The lid member 98 (FIG. 9A) of each of the second bi-molded plate assemblies 94 has a disc-like shape and is defined by oppositely disposed first and second major surfaces 104 and 106. The first major surface 104 has a generally smooth, flat configuration that gradually tapers around the edge 108 towards the second major surface 106. The second major surface 106 is adapted for mating with the receptacle member 96. As shown in FIG. 9A, the cavity 100 of the lid member 98 extends from the second major surface 106 towards the first major surface 104 such that the cavity is recessed within the second major surface. The cavity 100 of the lid member 98 defines a volume capable of holding between about 5% and about 40% of the multi-layered sandwich product 10 or 10' during the baking process.

Figure 10B:
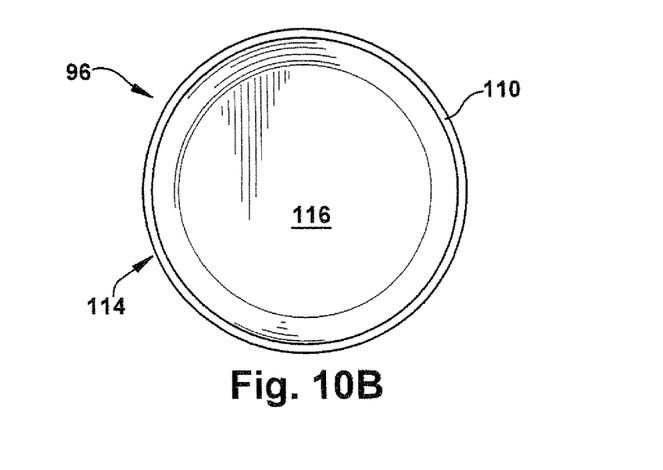
FIG. 10B is a top view of the receptacle member shown in FIG. 10A.

As shown in FIGS. 10A-B, the receptacle member 96 has a rounded, pan-shaped configuration. The receptacle member 96 includes oppositely disposed first and second major surfaces 110 and 112 and an annular side wall 114 that extends between the first and second major surfaces. The cavity 100 of the receptacle member 96 extends between the first major surface 110 and the bottom surface 116 of the receptacle member. The cavity 100 of the receptacle member 96 defines a volume that is greater than the volume of the lid member 98. The cavity 100 of the receptacle member 96 is capable of holding between about 60% and about 95% of the multi-layered sandwich product 10 or 10' during the baking process.

At Step 32, the method 30 can begin by heating the first baking plates 60 to a predetermined temperature (e.g., about 250° F. to about 400° F.). Either prior to, contemporaneous with, or subsequent to Step 32, the raw components of the multi-layered sandwich product 10 or 10' are prepared. For example, the yeast-leavened dough 18 can be formed by scaling (i.e., measuring out) the needed ingredients, which may include flour (e.g., about 27% to about 68% of the total batch weight), water (e.g., about 21% to about 57% of the total batch weight), milk powder (e.g., about 3% to about 9% of the total batch weight), eggs (e.g., about 2% to about 8% of the total batch weight), gluten (e.g., about 2% to about 5% of the total batch weight), sugar (e.g., about 2% to about 15% of the total batch weight), oil (e.g., about 0% to 7% of the total batch weight), yeast (e.g., about 1% to about 3% of the total batch weight), and salt (e.g., about 0.5% to about 2% of the total batch weight).

It will be appreciated that other ingredients may be added to adjust the flavor or improve the functionality of the yeast-leavened dough 18. Examples of ingredients that can be added to adjust the flavor of the yeast-leavened dough 18 can include butter, cheese, spices, natural flavorings, and fruit or nut inclusions. Examples of ingredients that may be added to improve the functionality of the yeast-leavened dough 18 can include baking enzymes, monoglycerides, fats and oils. After the ingredients are scaled, the ingredients are then mixed and kneaded together for a period of time sufficient to develop the gluten structure of the yeast-leavened dough 18. The fully developed, yeast-leavened dough 18 is then ready for subsequent use.

After preparing the yeast-leavened dough 18, and using a known bakery machining process, a measured amount of one or more fillings 16 is "encrusted" inside a measured amount of the yeast-leavened dough to form the sandwich insert 12 or 12'. The measured amount of filling 16 may range from about 15 grams to about 86 grams, and the measured amount of the yeast-leavened dough 18 may range from 12 grams to about 128 grams. After the filling 16 is encrusted inside the yeast-leavened dough 18, the formed product comprises a ball-shaped sandwich insert 12 or 12' that is completely enveloped by the yeast-leavened dough and includes the filling at its center.

Next, the sandwich insert 12 or 12' can be passed through a molding or shaping device (not shown) so that upper and lower portions of the sandwich insert are partially flattened. The molded sandwich insert 12 or 12' is then placed into a bakery proofing chamber 118 (FIG. 5) for a period of time sufficient to adequately "rise" or "proof" the sandwich insert prior to baking. The proofing time can vary from about 10 minutes to about 35 minutes, depending upon the type and size of the yeast-leavened dough 18 and the filling 16. After the sandwich insert 12 or 12' is adequately proofed, it is ready for subsequent use.

Either before, during, or after formation of the sandwich insert 12 or 12', the chemically-leavened batter layer 14 is prepared. Creation of the chemically-leavened batter layer 14 begins by scaling the necessary ingredients, which may include water (e.g., about 29% to about 68% of the total batch weight), flour (e.g., about 15% to about 40% of the total batch weight), eggs (e.g., about 7% to about 20% of the total batch weight), sugar (e.g., about 4% to about 15% of the total batch weight), milk powder (e.g., about 4% to about 12% of the total batch weight), oil (e.g., about 0% to about 7% of the total batch weight), baking powder (e.g., about 1% to about 2% of the total batch weight), baking soda (e.g., about 0% to about 2% of the total batch weight), and salt (e.g., about 0.5% to about 2% of the total batch weight).

It will be appreciated that other ingredients may be added to adjust the flavor or improve the functionality of the chemically-leavened batter layer 14. Examples of ingredients that may be added to adjust the flavor of the chemically-leavened batter layer 14 may include butter, cheese, meat, natural flavors or spices, fruits, nuts, and the like. Examples of ingredients that may be added to improve the functionality of the chemically-leavened batter layer 14 may include oils, fats, emulsifiers, and the like.

After scaling the desired ingredients, the ingredients are then thoroughly mixed until they are adequately combined into a partially liquid form, typically in a large temperature-controlled stirring vat (not shown). The mixed ingredients may then be transferred to a second batter mixer (not shown) where additional ingredients can be added (e.g., eggs), stirred at high speeds, and properly aerated. The resultant chemically-leavened batter layer 14 may then be placed inside a temperature-controlled container (i.e., first and second batter injectors 86 and 90) that will be used to deposit the chemically-leavened batter during the baking process.

Figure 6:
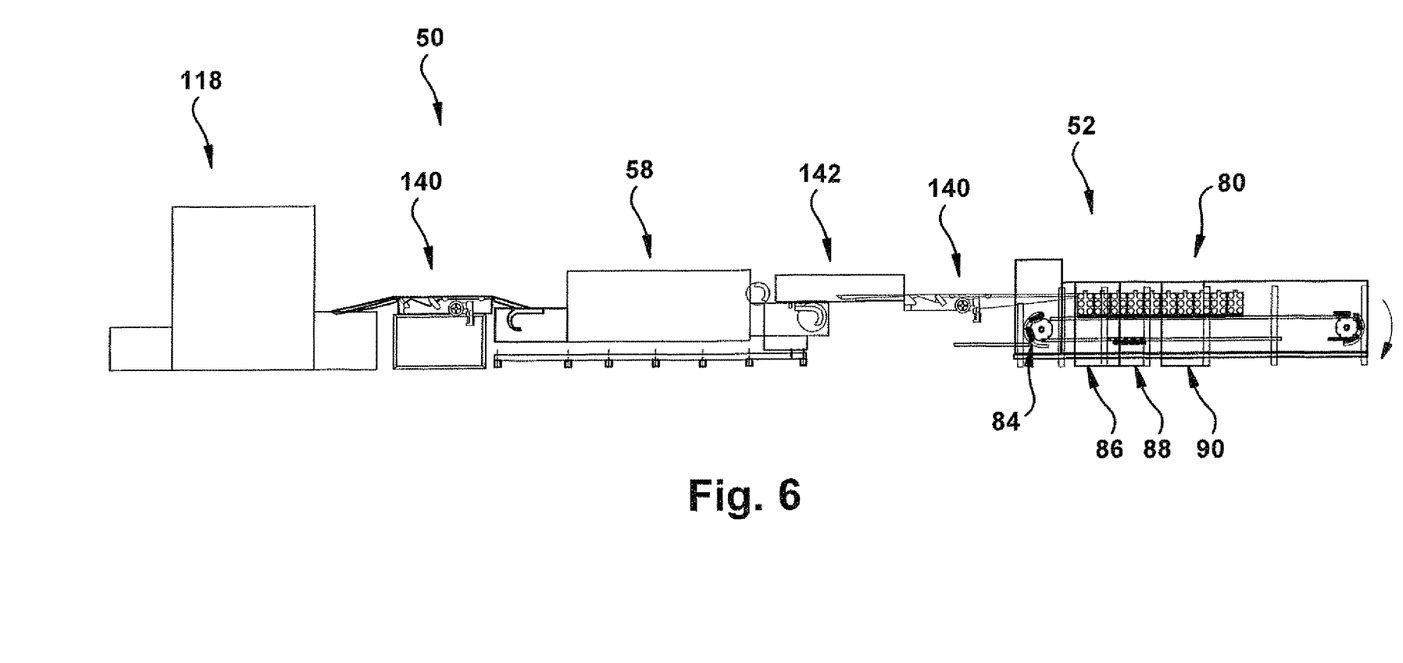
FIG. 6 is a schematic diagram showing an alternative configuration of the automated assembly line system in FIG. 5.

Following preparation of the sandwich insert 12 or 12' and the chemically-leavened batter 14, the sandwich insert can be partially baked at Step 34. As shown in FIG. 5, a sandwich insert 12 is taken from the proofing chamber 118 and deposited into a first baking plate 60 (i.e., the second plate 68 of a first bi-molded plate assembly 62). It will be appreciated that the sandwich insert 12 or 12' can be deposited into the first baking plate 60 by any one or combination of mechanisms known in the art, such as via a robotic arm or conveyor belt system 140 (FIG. 6). Once the sandwich insert 12 or 12' is deposited into the first baking plate 60, the baking plate rotates about the lower tract to securely mate with another baking plate, thereby forming a plurality of first bi-molded plate assemblies 62.

The baking plates 60 then move through an oven 58 (e.g., a tunnel oven) for a time and at a temperature sufficient to partially bake the sandwich insert 12 or 12'. For example, the first baking plates 60 can move through oven 58 so that the sandwich insert 12 or 12' is partially baked. In another example, the first baking plates 60 can move through oven 58 so that the sandwich insert 12 or 12' is par-baked. For instance, the first baking plates 60 can move through oven 58 for a time of about 40 seconds to about 2 minutes and at a temperature of about 250° F. to about 400° F. to partially, but not completely, bake the sandwich insert 12 or 12'.

After the first baking plates 60 pass through the oven 58, the baking plates are separated as shown in FIG. 5 so that the partially baked sandwich insert 12 or 12' can be removed from the plates and deposited into the sandwich insert feeding system 88. It will be appreciated that the partially baked sandwich insert 12 or 12' produced by the method 30 can be deposited into the sandwich insert feeding system 88 by any one or combination of mechanisms known in the art, such as a transfer machine 142 (FIG. 6) that removes the partially baked sandwich insert 12 or 12' from the first baking plates 60 and then passes the insert onto a conveyor belt system 140. Prior to depositing the partially baked sandwich insert 12 or 12' into the sandwich insert feeding system 88, the second baking plates 92 (and thus each of the second bi-molded plate assemblies 94) are heated to a predetermined temperature (e.g., about 300° F. to about 400° F.) at Step 36. Upon heating each of the second bi-molded plate assemblies 94 to the predetermined temperature and forming the components of the multi-layered sandwich product 10 or 10', the second assembly line 52 is activated so that the tract 74 progressively moves in a clock-wise motion at a predetermined rate.

At Step 38, the first batter injector 86 is operated to pour a first amount of the chemically-leavened batter layer 14 into the cavity 100 of each of the receptacle members 96. The first amount of the chemically-leavened batter layer 14 is delivered in an amount sufficient to cover at least the bottom surface 116 of each of the receptacle members 96. The total amount of the chemically-leavened batter layer 14 that is poured into the receptacle members 96 can vary between about 10 grams and about 128 grams, depending upon the type of multi-layered sandwich product 10 or 10' being made. It will be appreciated that a pan release agent (e.g., baking oil) can be applied to all or only a portion of the molded baking cavity 102 prior to the addition of the raw components to prevent or mitigate sticking.

At Step 40, the second baking plates 92 are advanced along the second assembly line 52 to the sandwich insert feeding system 88. The sandwich insert system 88 is then activated to place a partially baked sandwich insert 12 or 12' atop the first amount of the chemically-leavened batter layer 14 already in each of the receptacle members 96. The partially baked sandwich insert 12 or 12' is placed atop the first amount of the chemically-leavened batter layer 14 so that no portion of the sandwich insert comes into contact with each of the receptacle members 96. In other words, a partially baked sandwich insert 12 or 12' is placed in each of the receptacle members 96 so that each sandwich insert is at least partially enveloped by the first amount of the chemically-leavened batter layer 14. The volume of each of the receptacle members 96 filled by the first amount of the chemically-leavened batter layer 14 and the partially baked sandwich insert 12 or 12' can be from about 35% to about 65%.

As the second baking plates 92 continue to advance along the second assembly line 52, the second batter injector 90 is operated to pour a second amount of the chemically-leavened batter layer 14 into each of the receptacle members 96 (Step 42). The second amount of the chemically-leavened batter layer 14 is delivered in an amount sufficient to fill an additional 30% to about 65% of the cavity 100 of each of the receptacle members 96. Importantly, the second amount of the chemically-leavened batter layer 14 is poured into each of the receptacle members 96 such that each of the partially baked sandwich inserts 12 or 12' is completely enveloped by the chemically-leavened batter layer.

At Step 44, each of the second bi-molded plate assemblies 94 is arranged to form the molded baking cavity 102. For example, the second major surface 106 of each of the lid members 98 is securely mated with the first major surface 110 of each of the receptacle members 96 to form a heated and sealed molded baking cavity 102. It will be appreciated that Steps 36-44 of the method 30 plus a first baking period are conducted during a first period of time (Step 46), which is about 10% to about 40% of the total time required to bake the multi-layered sandwich product 10 or 10'.

Figure 11:
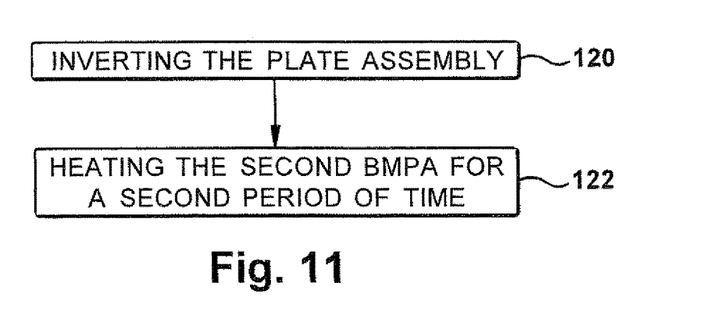
FIG. 11 is a process flow diagram illustrating a further aspect of the method shown in FIG. 4.

After assembling the molded baking cavities 102 and then baking for the first period of time, the second baking plates 92 are rotated about the rotation members 82 (indicated by arrows) so that each of the second bi-molded plate assemblies 94 is inverted (Step 120) (FIG. 11). Inverting the second bi-molded plate assemblies 94 allows the chemically-leavened batter layer 14 to distribute better within each of the molded baking cavities 102, while also facilitating more even baking throughout the multi-layered sandwich product 10 or 10'. After inverting the second baking plates 92, the second baking plates are heated for a second period of time, which is greater than the first period of time (Step 122). For example, the second period of time can be about 60% to about 90% of the total time needed to bake the multi-layered sandwich product 10 or 10'. By baking all components of the multi-layered sandwich product 10 under pressure and at a uniform temperature, the yeast-leavened dough 18 and the chemically-leavened batter layer 14 can be combined to form a partially seamless, borderless product.

At Step 48 (FIG. 4), the automatic removing system 84 separates the lid member 98 and the receptacle member 96 of each of the second bi-molded plate assemblies 94 after the multi-layered sandwich product 10 or 10' has been sufficiently baked. Since each of the receptacle members 96 is inverted, separation of the lid members 98 from the receptacle members allows the multi-layered sandwich product 10 or 10' to be easily removed from the second bi-molded plate assemblies 94 via gravity. After removing the multi-layered sandwich product 10 or 10' from each of the bi-molded plate assemblies 94, the multi-layered sandwich product is cooled for an appropriate period of time before freezing, wrapping and packaging. The packaged, multi-layered sandwich product 10 or 10' can be boxed and further frozen ahead of distribution to the marketplace.

Figure 12:
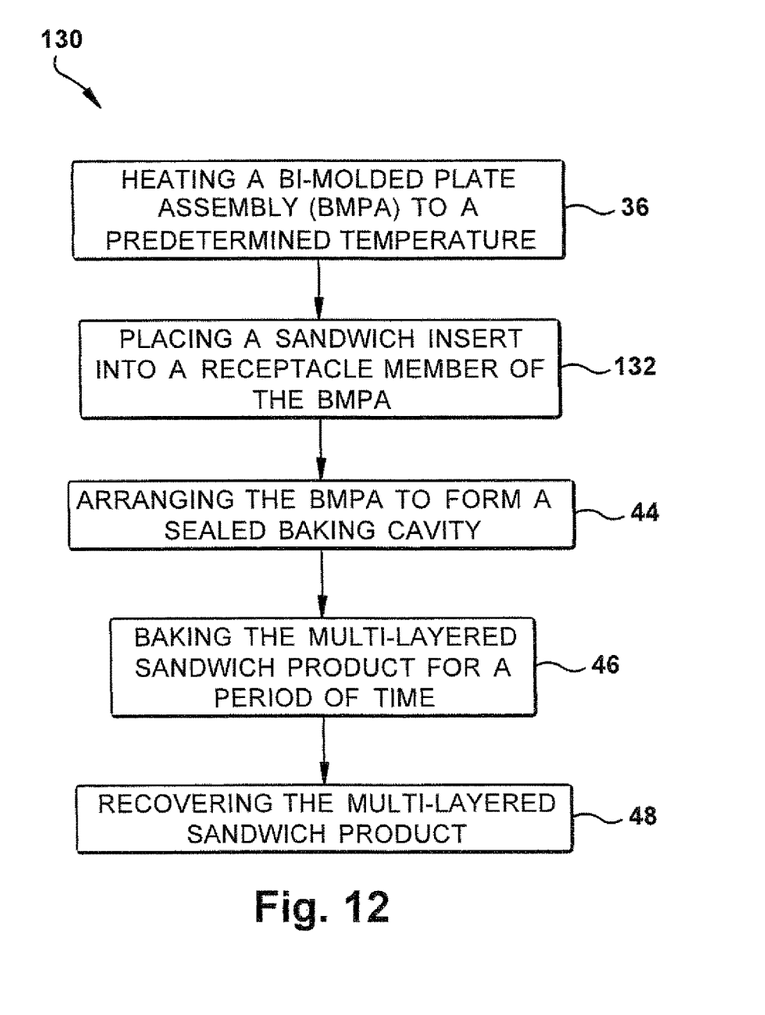
FIG. 12 is a process flow diagram illustrating a method for forming a multi-layered sandwich product according to another aspect of the present invention.

As illustrated in FIG. 12, another aspect of the present invention includes a method 130 for forming a multi-layered sandwich product 10". The method 130 is similar to the method 30 illustrated in FIG. 4. For example, the method 130 can be performed using an automated assembly line that is identical or similar to the first automated assembly line 50 described above. Additionally, the method 130 can be performed using bi-molded plate assemblies (not shown) that are similar to the second bi-molded plate assemblies 94 described above. For example, each of the receptacle members comprising the bi-molded plate assemblies can have a volume that is about the same as the volume of the lid members.

At Step 36, the method 130 can begin by heating the bi-molded plate assemblies to a predetermined temperature (e.g., about 300° F. to about 400° F.). Either prior to, contemporaneous with, or subsequent to Step 36, the raw components of the multi-layered sandwich product 10" can be prepared. For example, the yeast-leavened dough 18 can be formed by scaling (i.e., measuring out) the needed ingredients (as described above). As also described above, it will be appreciated that other ingredients may be added to adjust the flavor or improve the functionality of the yeast-leavened dough 18.

After the ingredients are scaled, the ingredients can then be mixed and kneaded together for a period of time sufficient to develop the gluten structure of the yeast-leavened dough 18. Next, a measured amount of one or more fillings 16 can be "encrusted" inside a measured amount of the yeast-leavened dough 18 using a known bakery machining process. The measured amount of filling 16 may range from about 15 grams to about 86 grams, and the measured amount of the yeast-leavened dough 18 may range from 12 grams to about 128 grams. After the filling 16 is encrusted inside the yeast-leavened dough 18, the formed product comprises a ball-shaped sandwich insert 12" that is completely enveloped by the yeast-leavened dough and includes the filling at its center.

Next, the sandwich insert 12" can be passed through a molding or shaping device (not shown) so that upper and lower portions of the sandwich insert are partially flattened. The molded sandwich insert 12" is then placed into a bakery proofing chamber 118 for a period of time sufficient to adequately "rise" or "proof" the sandwich insert prior to baking. The proofing time can vary from about 10 minutes to about 35 minutes, depending upon the type and size of the yeast-leavened dough 18 and the filling 16. After the sandwich insert 12" is adequately proofed, it is ready for subsequent use.

Upon heating each of the bi-molded plate assemblies to the predetermined temperature and forming the raw components of the multi-layered sandwich product 10", the sandwich insert 12" can be placed into a receptacle member of a bi-molded plate assembly (Step 132) and the lid member mated with the receptacle member to form a sealed baking cavity (Step 44).

Following formation of the sealed baking cavity, the sandwich insert 12" can be entirely baked at Step 46. As described above, a sandwich insert 12" is taken from the proofing chamber 118 and deposited into the receptacle member of a bi-molded plate assembly. It will be appreciated that the sandwich insert 12" can be deposited into the receptacle member by any one or combination of mechanisms known in the art, such as via a robotic arm or conveyor belt system 140 (FIG. 6). Once the sandwich insert 12" is deposited into the receptacle member, the receptacle members and the lid members rotate about the tracts of an oven 58 (e.g., a tunnel oven) to securely mate with another and thereby form a plurality of bi-molded plate assemblies.

The bi-molded plate assemblies then move through the oven 58 for a time and at a temperature sufficient to completely bake the sandwich insert 12". For example, the bi-molded plate assemblies can move through oven 58 so that the sandwich insert 12" is baked to completion (100% baked). For instance, the first bi-molded plate assemblies can move through the oven 58 for a time of about 2 minutes to about 4 minutes and at a temperature of about 300° F. to about 400° F. to completely bake the sandwich insert 12".

After the bi-molded plate assemblies pass through the oven 58, the receptacle members and the lid members are separated as shown in FIG. 5 so that the multi-layered sandwich product 10" can be removed from the plates and cooled for an appropriate period of time before freezing, wrapping and packaging. The packaged, multi-layered sandwich product 10" can be boxed and further frozen ahead of distribution to the marketplace.

From the above description of the invention, those skilled in the art will perceive improvements, changes and modifications. Such improvements, changes, and modifications are within the skill of the art and are intended to be covered by the appended claims.

Having described the invention, the following is claimed:

1. A multi-layered sandwich product for preparation in a microwave oven comprising:
   a yeast-leavened dough sandwich insert comprising a proofed and baked yeast-leavened dough and a filling, the yeast-leavened dough completely envelopes the filling, the yeast-leavened dough prior to being proofed and baked comprising from about 21 wt % to about 57 wt % water, from about 27 wt % to about 68 wt % flour, from about 1 wt % to about 3 wt % yeast, from about 2 wt % to about 8 wt % eggs, and from about 2 wt % to about 5 wt % of gluten, in which a wt % of yeast to flour is from about 3% to about 6%, the amount of yeast and gluten sufficient to develop a strong gluten structure such that the a yeast-leavened dough sandwich insert accumulates carbon dioxide bubbles, said yeast-leavened dough layer providing support to said food product to facilitate in eating said food product as a sandwich; and
   a baked chemically-leavened batter layer that completely envelopes said yeast-leavened dough sandwich insert, the chemically-leavened batter layer prior to being baked is a pourable batter comprising from about 29 wt % to about 68 wt % water, from about 15 wt % to about 40 wt % flour, from about 1 wt % to about 4 wt % of a chemical leavening agent, and from about 7 wt % to about 20 wt % eggs, in which a wt % of the chemical leavening agent to flour is from about 4% to about 8%, said chemically-leavened batter layer forming a soft cake or quick bread-like layer over said yeast-leavened dough layer;
   wherein the proofed and baked yeast-leaved dough is disposed between the filling and the baked chemically-leavened batter layer, the proofed and baked yeast-leaved dough has a less coarse texture than the baked chemically-leavened batter layer, and the multi-layered sandwich product has a first molded configuration and the yeast-leavened dough sandwich insert has a second molded configuration, the multi-layered sandwich product having a crispy exterior without a chewy or tough consistency after microwave cooking, and
   wherein said chemically-leavened batter layer has a different ingredient composition from said yeast-leavened dough, said filling has a different composition from said chemically-leavened batter layer and said yeast-leavened dough, and,
   wherein said proofed and baked yeast-leavened dough has been proofed and baked prior to said chemically-leavened batter layer enveloping said yeast-leavened dough sandwich insert.

2. The multi-layered sandwich product of claim 1, wherein said yeast-leavened dough sandwich insert further comprises oppositely disposed first and second major surfaces, at least one of said first and second major surfaces including a plurality of finger members that projects outwardly from said at least one of first and second major surfaces said plurality of finger members configured to facilitate in securing said chemically-leavened batter layer to said yeast-leavened dough sandwich insert, said plurality of finger members not extending beyond an outermost surface of said chemically-leavened batter layer.

3. The multi-layered sandwich product of claim 1, wherein the weight-percentage (wt-%) of said filling is about 15% to about 60% of the total weight of said multi-layered sandwich product.

4. The multi-layered sandwich product of claim 1, wherein the wt-% of said yeast-leavened dough is about 10% to about 60% of the total weight of said multi-layered sandwich product.

5. The multi-layered sandwich product of claim 1, wherein the wt-% of said chemically-leavened batter is about 15% to about 60% of the total weight of said multi-layered sandwich product.

6. The multi-layered sandwich product of claim 1, wherein one or more of said at least one finger member is in direct contact with a portion of said chemically-leavened batter layer.

7. The multi-layered sandwich product of claim 1, wherein an inner surface of the chemically-leavened batter layer is in direct physical contact with an outer surface of the yeast-leavened dough.

8. The multi-layered sandwich product of claim 1, wherein the yeast-leavened dough sandwich insert is partially baked.

9. The multi-layered sandwich product of claim 1, wherein the yeast-leavened dough sandwich insert comprises from about 12 g to about 128 g of the yeast-leavened dough and from about 15 g to about 86 g of the filling.

10. The multi-layered sandwich product of claim 1, wherein the chemically-leavened batter layer is aerated.

11. The multi-layered food product as defined in claim 1, wherein said yeast-leavened dough is absent chemical leavening agent and said chemically-leavened batter layer is absent yeast.

12. The multi-layered food product as defined in claim 1, wherein said yeast-leavened dough layer fully encapsulates said filling, said chemically-leavened batter layer fully encapsulates said yeast-leavened dough sandwich insert.

* * * * *